United States Patent [19]

Wagner

[11] 3,734,405

[45] May 22, 1973

[54] THERMOSTATICALLY OPERATED BY-PASS VALVE

[76] Inventor: Joseph P. Wagner, 136 Surburban Road, Knoxville, Tenn. 37919

[22] Filed: June 1, 1971

[21] Appl. No.: 148,675

[52] U.S. Cl..............................................236/34.5
[51] Int. Cl................................................F01p 7/02
[58] Field of Search................................236/34, 34.5

[56] References Cited

UNITED STATES PATENTS

| | | | |
|---|---|---|---|
| 2,810,524 | 10/1957 | Puster | 236/34 |
| 3,182,910 | 5/1965 | Karppinen | 236/34 |

Primary Examiner—William F. O'Dea
Assistant Examiner—Peter D. Ferguson
Attorney—Brenner, O'Brien and Guay

[57] ABSTRACT

A thermostatically operated by-pass valve for controlling a flow of fluid to a pair of conduits, includes a piston stem member having an outer end and a sleeve valve element having a central opening and adapted to control the flow of fluid to the conduits and an elongated cup-shaped element slidably disposed within the central opening of the sleeve valve element and adapted to engage interiorly a substantial portion of the outer end of the piston stem member, wherein the ratios of the diameters of the piston stem member and the cup-shaped member to the diameter of the sleeve valve element are relatively large, to thereby minimize rocking of the sleeve valve element in order to reduce wear of the sleeve valve element and its seal.

5 Claims, 3 Drawing Figures

Patented May 22, 1973
3,734,405
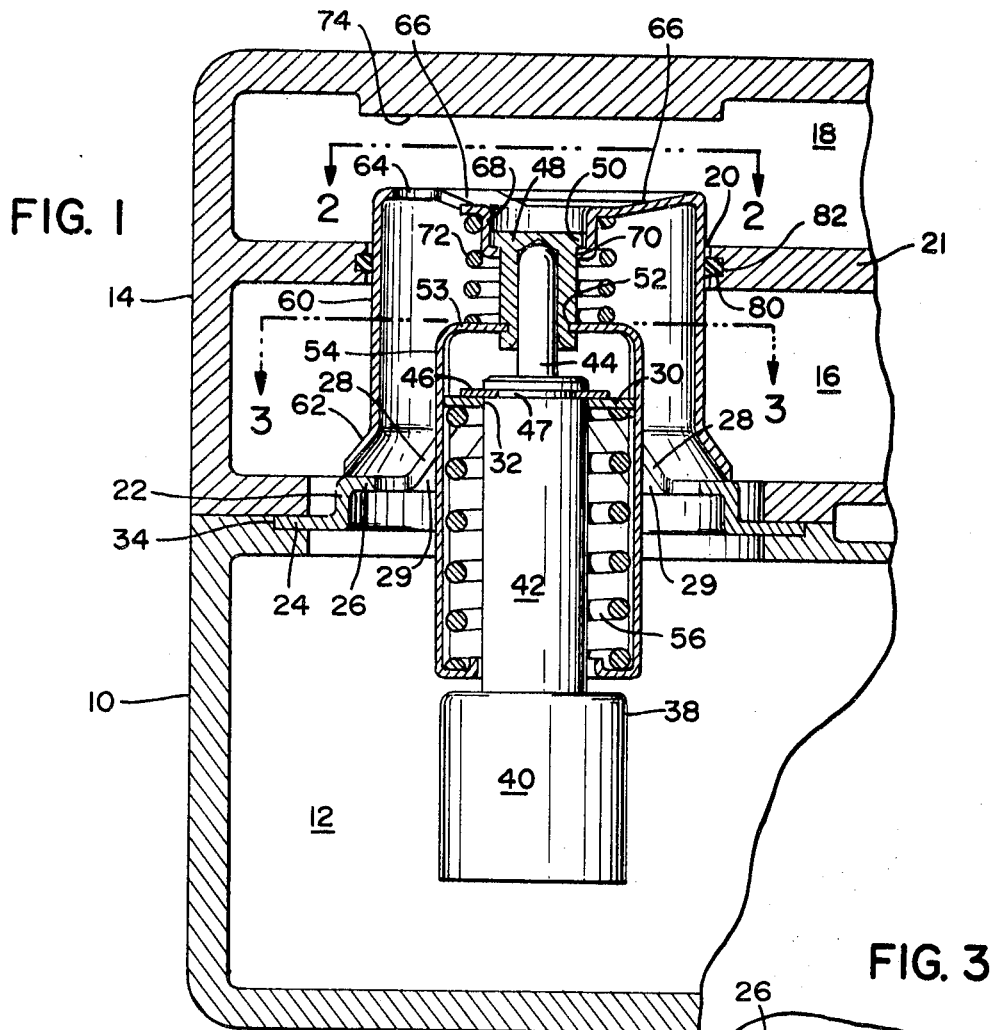
FIG. 1
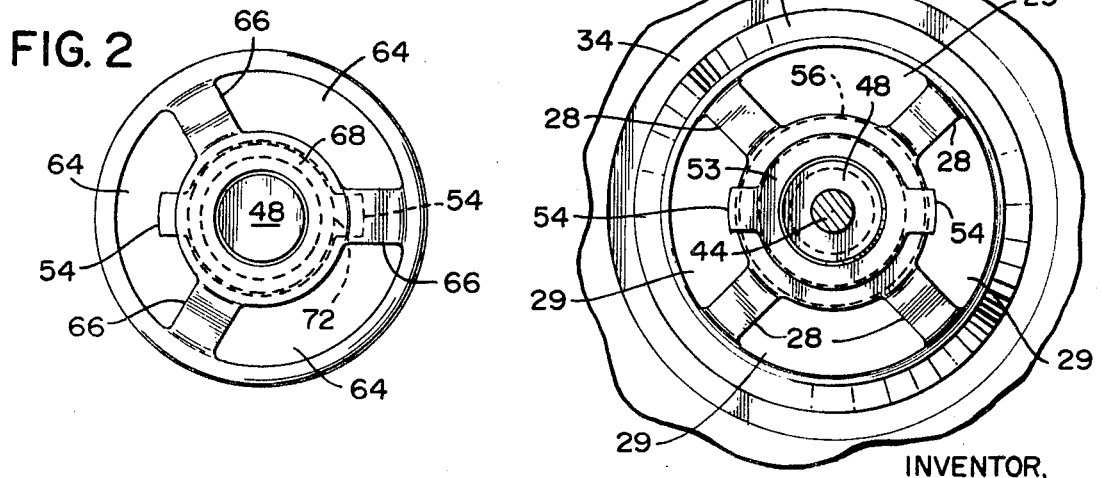
FIG. 2
FIG. 3
INVENTOR,
Joseph P. Wagner
BY Brenner, O'Brien & ......
ATTORNEYS 3,734,405

THERMOSTATICALLY OPERATED BY-PASS VALVE

BACKGROUND OF THE INVENTION

1. Field of the Invention

This invention relates to a thermostatically operated by-pass valve and more particularly to a partially balanced sleeve-type thermostatically operated by-pass valve used to control the flow of fluid in a plurality of conduits such as a main conduit and a by-pass conduit in an engine cooling system particularly of the type utilized in trucks.

2. Description of the Prior Art

Thermostatically operated by-pass valves are well known in the prior art. For example, the design of one such valve is described in U.S. Pat. No. 2,919,860. While the operation of the valve described in this patent has been quite satisfactory for most purposes, it has been found that this valve design has not been completely satisfactory for heavy duty purposes. More particularly, it has been found that this valve design has been subject to a considerable amount of wear in heavy duty engines such as those employed in trucks. This wear occurs on the exterior of the sleeve valve member and especially on the seal which is connected to the engine head to provide a sealing means with the sleeve valve member between the two conduits, one of which is the by-pass conduit back to the engine and the other is the conduit leading to the radiator. Also, it has been found that the adjustment means for adjusting the temperature setting of the thermostat has not been completely satisfactory from the standpoint of manufacturing simplicity. More particularly, after the proper setting of the adjustment member has been determined it has heretofor been necessary to weld the adjustment member to the piston stem. This can be accomplished only with a certain amount of difficulty since this area of the thermostat is relatively difficult to reach with conventional welding equipment.

SUMMARY OF THE INVENTION

The present invention relates to an improvement in thermostatically operated by-pass valves for controlling the flow of fluid to a pair of conduits in which the valve includes a piston stem member having an outer end and a sleeve valve element having a central opening and adapted to control the flow of fluid to the conduits, wherein the improvement includes an elongated cup-shaped element slidably disposed within the central opening of the sleeve valve element and adapted to engage interiorly a substantial portion of the outer end of the piston stem member, wherein the ratios of the diameters of the piston stem member and the cup-shaped member to the diameter of the sleeve valve element are relatively large.

It is an object of the present invention to provide a thermostatically operated by-pass valve having increased life as a result of reduced wear of the valve and its sealing means.

It is a further object of the present invention to provide an improved thermostatically operated by-pass valve in which the temperature setting of the valve may be more conveniently adjusted.

It is a still further object of the present invention to provide an improved thermostatically operated by-pass valve which is simpler and less expensive to manufacture and service.

Other objects and advantages of the present invention will become apparent from the following description taken in conjunction with the accompanying drawings.

BRIEF DESCRIPTION OF THE DRAWINGS

FIG. 1 is a cross-sectional view of the valve of the present invention with some of the components of the valve shown in elevation and with the valve installed in an engine cooling system;

FIG. 2 is a top plan view taken along the line 2—2 of FIG. 1; and

FIG. 3 is a top plan view of a section taken along the line 3—3 of FIG. 1.

DESCRIPTION OF THE PREFERRED EMBODIMENT

A thermostatically operated by-pass valve of the present invention is illustrated in FIG. 1 installed in an internal combustion engine and in particular in a truck engine to control the flow of fluid in the cooling system thereof. The engine includes a block 10 (shown cut-away) having a coolant or fluid jacket 12 therein and a head 14 (shown cut-away) having a main fluid conduit 16 and a by-pass fluid conduit 18 therein. The main conduit 16 and the by-pass conduit 18 are disposed substantially in parallel in engine head 14 and are interconnected by a passage 20 in a wall 21 separating the two conduits.

The thermostatically operated by-pass valve includes a perforated member or spider generally designated by the reference numeral 22 which is comprised of an annular flange 24 having a valve seat 26 formed thereon and provided with a plurality of (in this embodiment, four) integral legs 28 extending obliquely inwardly therefrom and defining a plurality of (in this embodiment, four) ports 29. The legs 28 terminate at their inner extremity in an annular ring 30 which defines a centrally disposed aperture 32 in the spider. The annular flange 24 is adapted to be seated in an annular recess or shoulder 34 in the engine block 10. A compressible gasket (not shown) is normally interposed between the block 10 and the head 14 to prevent possible fluid leakage therebetween.

The spider 22 supports or carries a pressure insensitive wax fusion type thermostat or thermal element generally designated by the reference numeral 38. The thermostat 38 includes a base or casing 40, a piston section member 42 and an extendible and retractable piston stem member 44 which is slidably received in the bore (not shown) of the piston section member 42. The casing 40 may be filled with a wax like substance (not shown) which changes from a solid to a liquid at a predetermined temperature and the resultant change in volume thereof produces movement of a diaphragm (not shown) located in the piston section member 42 which in turn imparts movement to the extendible and retractable piston stem member 44. A snap ring 46 is assembled in a groove 47 in the top of piston section member 42, which thereby supports thermostat 38 in aperture 32 of annular ring 30.

The pressure insensitive thermostat 38 is insensitive to static or system pressures within the engine cooling system which are produced by the expansion of the coolant fluid that compresses the air trapped in the system in combination with the actual expansion of the trapped air plus the vapor pressure of the coolant.

These static or system pressures when applied to the thermostat piston stem 44 will be transmitted to the diaphragm and wax like substance within the thermostat 38, but the wax like substance is for all practical purposes incompressible. In view of this incompressibility of the wax like substance the movement of the thermostat piston 45 is not affected by static or system pressures or by a change in external loading. Inasmuch as thermostats of this type are well known in the art, further discussion of the structure and function thereof is deemed unnecessary.

The thermostat 38 is seated by means of snap ring 46 on the annular ring 30 of the spider 22 whereby the casing 40 of the thermostat projects outwardly of the spider into the main cooling jacket 12. Being so positioned the wax like substance in the casing 40 of the thermostat 38 readily reflects any changes in the temperature of the coolant in the jacket 12.

An elongated cup-shaped member 48 is disposed about the outer end of piston stem member 44. The interior of cup-shaped member 48 is designed such that it is adapted to receive a substantial portion of the outer end of piston stem member 44 in slidable relationship. Cup-shaped member 48 is provided at this upper closed end with an annular flange 50. At its other end cup-shaped member 48 is provided with an annular outer recess 52 adapted to engage an annular ring 53 to which are attached a plurality of (in this embodiment, two) strap members 54. Disposed about piston section member 42 is a compression or load spring 56. One end of load spring 56 is connected to one end of strap members 54 and the other end of spring 56 engages annular ring 30 of spider 22.

A partially balanced cylindrical sleeve member generally designated by the reference numeral 60 is slidably and resiliently retained on the cup-shaped member 48. At the lower end thereof the valve member 60 is "open" and is provided with an annular end wall 62 which is adapted to move into and out of engagement with the spider valve seat 26, as will be described more in detail hereinafter. At the opposite end thereof, valve member 60 is provided with a plurality of (in this embodiment, three) sector-shaped ports 64 which define a plurality of (in this embodiment, three) inclined and inwardly extending legs 66. The legs 66 terminate at their inner extremities in a centrally disposed central hub 68 having a circular aperture 70 extending therethrough. The valve member 60 is retained on cup-shaped member 48 by a compression or over-run spring 72 having one end thereof seated on ring 53 and the opposite end thereof seated on the centrally disposed hub 68 of the valve member 60. The diameter of the aperture 70 in hub 68 is slightly larger than the outer diameter of the cup-shaped member 48 and the spring 72 urges the hub 68 tightly into engagement with the flange 50 of cup-shaped member 48 and thereby holds the valve member 60 in an assembled engagement therewith.

The cup-shaped member 48 is designed to engage the major portion (for example, 75 percent) of the outer end of the piston stem member 44 when the thermostat is in its closed position. Also, the ratios of the diameters of the piston stem member 44 and the cup-shaped member 48 to the diameter of sleeve valve element 60 are designed to be relatively large. Thus, the ratio of the diameter of the piston stem member 44 to the diameter of the sleeve valve element 60 will be normally at least 0.1, and generally in the range of about 0.1 to 0.2, and the ratio of the outside diameter of the cup-shaped member 48 to the diameter of the sleeve valve element 60 will be normally at least about 0.2. The ratio of the outside diameter of the cup-shaped member 48 to the diameter of the piston stem member 44 will be normally in the range of about 1.5 to 2.5. In a specific embodiment of the valve of the present invention the ratio of the diameter of the piston stem member 44 to the diameter of the sleeve valve element is about 0.15 and the ratio of the outside diameter of the cup-shaped member 48 to the diameter of the piston stem member 44 is about 2.0.

An annular sealing ring 80 is disposed in an annular recess 82 of wall 21 to provide a sealing means between valve member 60 and wall 21 in respect of the annular spacing between these two members.

Operation of the Valve

At the start-up of the engine the annular end wall 62 of the valve member 60 is seated on the spider valve seat 26 due to the downward thrust of compression or load spring 56. In this position of the valve member 60 the total flow of coolant in engine jacket 12 will pass via ports 29 through the interior of the valve member 60 and then through ports 64 and will be discharged into by-pass conduit 18 back to the engine. The valve member 60 will remain seated on the valve seat 26 as long as the temperature of the coolant in jacket 12 remains below a predetermined minimum degree.

On the other hand if the temperature of the coolant in jacket 12 rises above the predetermined minimum degree, piston stem member 44 of the thermostat 38 will be extended upwardly and will overcome the thrust of spring 56 to unseat the valve member 60. With the valve member 60 unseated the coolant in jacket 12 will be discharge into both the by-pass conduit 18 and the main conduit 16.

If the temperature of the coolant continues to increase and exceeds a predetermined maximum degree the valve member 70 will be moved upwardly in FIG. 1 until the upper portion of valve member 60 engages with seat 74 in engine head 14. In this position the flow of coolant through the interior of the valve member 60 will be obstructed so that no coolant will flow through the by-pass conduit 18. The total volume of coolant in jacket 12 will now flow around valve member 60 and be discharged into the main conduit 16.

If the temperature of the jacket coolant should continue to increase after the valve member 60 has been moved in contact with seat 74 and thereby produce an "over-run" of the thermostat piston stem 44, the thrust of piston stem 44 will compress the over-run spring 72 and move the stem 44 and the cup-shaped member 48 upwardly. The use of the over-run spring 72 and the slidable connection between the cup-shaped member 48 and the valve member hub 68 permits relative movement between the valve member 60 and the piston stem 44 (and its associated cup-shaped member 48) and thus prevents damage to the various parts of the valve in the event of excessive coolant temperatures in jacket 12.

In heavy duty engines of the truck type there will be frequent movement of the thermostat valve which will cause wear of the seal 80 as well as wear of the valve element 60 in that area in which it engages seal 80. Also, in the case of heavy duty engines of the truck type a considerably greater volume of coolant must be controlled by the thermostat than would be the case in the operation of normal automotive engines. The force of the coolant flowing through the thermostat tends to rock the valve element 60 about the piston stem member 44 which leads to a much greater degree of wear of the valve member 60 and the seal 80 then would be expected under normal automotive usage. This results in reducing the life of the thermostat as well as increasing the servicing and maintenance costs of operating truck engines. The present invention overcomes these disadvantages of the prior art thermostats by providing the cup-shaped member 48.

Thermostat valves designed in accordance with the present invention have greater stability, i.e., a greatly reduced tendency to rock or wobble and thereby cause excessive wear of the valve element 60 and seal 80. This is believed to result from the reduced moment arm of the valve element 60 about the piston stem member 44, which is attributed primarily to the provision in accordance with the present invention of the cup-shaped member 48. Also the location of the main spring is above the heat responsive portion of the thermal element which reduces the leverage to tilt upon "over-run." Greater stability is also obtained by disposing the over-run stem in alignment or level with the seal 80 so that there is a reduced moment arm which could cause wear of the sleeve. Experiments conducted with the valve of the present invention demonstrate that it has a life of nearly double those of prior art valves of otherwise similar design but which do not include the cup-shaped member 48.

The thermostatic valve design of the present invention can also be more conveniently and simply adjusted to the desired temperature setting than those prior art designs which include an adjustment member disposed at the end of the piston stem member which after the proper setting has been determined are welded together. In the valve design of the present invention, the proper setting can be accomplished by simply "dimpling" the base or casing 40 at its circumference to thereby extend the plunger and piston stem member to the desired setting.

Inasmuch as the present invention is subject to many modifications, variations and changes in detail, it is intended that all matter contained in the foregoing description or shown in the accompanying drawings shall be interpreted as illustrative and not in a limiting sense.

What is claimed is:

1. In a thermostatically operated by-pass valve for controlling a flow of fluid to a pair of conduit means, the combination comprising a perforated member through which the flow of fluid passes and having a central opening and a valve seat surrounding said opening;

a sleeve valve element with a diameter adapted to engage a sealing means between said conduit means and having an open end cooperating with said valve seat for controlling the flow of fluid to one of said conduit means and having a ported end adapted to cooperate with the other of the conduit means for controlling the flow of fluid thereto, said ported end being also provided with a central opening;

thermally responsive means including a piston stem member with a diameter smaller than that of said sleeve valve element and a piston section member disposed within said central opening of said perforated member;

an elongated cup-shaped element with an outside diameter smaller than that of said sleeve valve element adapted to receive in its interior a substantial portion of the outer end of said piston stem member and adapted to slidably engage at its outer periphery the portion of said sleeve valve element defining its central opening;

first spring means disposed about said piston section and abutting at one of its ends against said perforated member;

means for connecting said cup-shaped element with the other end of said first spring means; and second spring means disposed about said cup-shaped element and butting at one end of its ends against said sleeve valve element and at its other end against said connecting means.

2. The invention of claim 1 wherein the cup-shaped member engages the major portion of the outer end of the piston stem member when said valve is in its closed position.

3. The invention of claim 2 wherein the ratio of the diameter of said piston stem member to the diameter of said sleeve valve element is at least about 0.1.

4. The invention of claim 3 wherein the ratio of the outside diameter of said cup-shaped element to the diameter of said sleeve valve element is at least about 0.2.

5. The invention of claim 4 wherein the ratio of the diameter of said piston stem member to the diameter of said sleeve valve element is in the range of about 0.1 to 0.2 and the ratio of the outside diameter of said cup-shaped element to the diameter of said piston stem member is in the range of about 1.5 to 2.5.

* * * * *